United States Patent [19]
Lester

[11] 3,951,111
[45] Apr. 20, 1976

[54] ENERGY CONVERTER

[76] Inventor: William M. Lester, 8 Brayton Road, Livingston, N.J. 07039

[22] Filed: July 10, 1974

[21] Appl. No.: 487,007

[52] U.S. Cl. .............................. 123/8.41; 123/8.23; 418/13; 418/83; 418/147; 418/266; 418/104
[51] Int. Cl.² ........................................ F02B 53/08
[58] Field of Search ................. 123/8.41, 8.25, 8.23; 418/13; 60/39.61

[56] References Cited
UNITED STATES PATENTS

| | | | |
|---|---|---|---|
| 1,309,554 | 7/1919 | Tiberti | 123/8.41 |
| 1,615,110 | 1/1927 | Craig | 123/8.41 |
| 1,748,568 | 2/1930 | Grover | 123/8.41 |
| 1,792,026 | 2/1931 | Nichols | 123/8.41 |
| 1,850,904 | 3/1932 | Woodward | 123/8.25 |
| 2,075,561 | 3/1937 | Wellensiek | 123/8.41 |
| 2,158,532 | 5/1939 | Bullen | 123/8.23 |
| 3,797,237 | 3/1974 | Kamiya | 123/8.25 X |

*Primary Examiner*—Clarence R. Gordon
*Attorney, Agent, or Firm*—J. B. Felshin

[57] ABSTRACT

This engine or energy converter has a casing comprising coaxial spaced sections each having a cavity bounded by opposed parallel flat inner side surfaces merging with semi-cylindrical top and bottom inner surfaces and a rotor coaxial with said sections, having rotor portions in said sections. Said rotor portions carry outwardly spring pressed opposed aligned radial pistons. The pistons of one rotor portion are disposed at right angles to the pistons of the other rotor portion. In each section there is formed a top chamber on one side of the rotor portion for said sections and a bottom chamber on opposite side of the rotor portion for said section. Means is provided to feed combustion gases to the top chambers of said sections in timed relation, to compress said gases in said top chambers, to form explosive charges, transfer the charges from the top chamber of each section to the bottom chamber of the other section, to fire the charges in the bottom chambers in timed relation to explode the charges, and to exhaust the combustion gases in timed relation.

33 Claims, 9 Drawing Figures

ENERGY CONVERTER

This invention relates to energy converter such as rotary internal combustion engines.

An object of this invention is to provide an engine of the character described comprising a casing having a plurality of coaxial, spaced engine casing sections, each having flat parallel, coextensive opposed inner surfaces joined by top and bottom semi-cylindrical surfaces, with cylindrical rotor portions in said sections and coaxial therewith and fixed to each other and each forming top and bottom chambers and each carrying a pair of radial, oppositely spring pressed pistons pressed into contact with the inner surfaces of said sections, with the pistons on one rotor portion being at an angle to the pistons of said other rotor portion.

Another object of this invention is to provide an engine of the character described provided with means to feed combustion gases into the top chamber of one section, then compress said gases in said top chamber to provide explosive charge, then to pass the charge to the bottom chamber of the other section, then to fire the transferred charge in said bottom chamber to explode the charge, and then exhaust said exploded gases from said bottom chamber, and to feed combustion gases to the top chamber of said other section and pass the compressed gases from the top chamber of said other section to the bottom chamber of said first section and fire the gases in said bottom chamber of said section to explode the charge, and to then exhaust said exploded gases of said bottom chamber of said first section.

Yet another object of this invention is to provide an engine of the character described in which the outer ends of said pistons of each rotor portion carry swivelled members having wiping contact with the inner surfaces of a section of the casing.

Still another object of this invention is to provide an engine of the character described in which a portion of the rotor controls the timing of the energizing of spark plugs to fire the charges in the bottom chambers of said sections.

A further object of this invention is to provide an engine of the character described comprising a central rotary valve between the two rotor portions and fixed thereto, fixed plates having wiping contact with opposite sides of said rotary valve, circular inner end plates fixed to the inner ends of said rotor portions and having wiping contact with said fixed plates, and outer circular end plates fixed to the outer ends of said rotor portions and having wiping contact with end plates of the engine casing, said inner and outer annular plates having contact with side edges of said pistons and rotating with said pistons but allowing the pistons to slide radially inwardly and outwardly relative to said annular plates, to thereby reduce friction at the side edges of said pistons.

A still further object of this invention is to provide an engine of the character described in which the rotary valve has passages adapted to register with passages in said fixed plates and in said inner rotary plates to permit timed passage of combustion gas charges from the top chamber of each of a pair of sections to the bottom chamber of the other section of said pair of sections.

yet a further object of this invention is to provide a strong and durable rotary engine of the character described which shall be relatively inexpensive to manufacture, easy to assemble and which shall yet be efficient and practical to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

Referring now in detail to the drawing, 10 designates an energy converter a rotary internal combustion engine embodying the invention. Said engine 10 comprises a casing 11. Said casing 11 comprises end pressure plates 12. Plates 12 are each formed with a circle of twelve equiangularly spaced longitudinal through holes 12a. Elongated bolts of tie rods 14 have their ends passing through said holes 12a. Nuts 15 screwed to the threaded ends of said bolts, clamp the end plates 12, to other parts of the casing, as will be explained hereinafter. Between the end plates 12 is a central ring 17. On opposite sides of the ring 17 are inner end cover plates 18, 19. Between the fixed inner end cover plate 18 and the outer end pressure plate 12 is a casing or engine section 20. Between the end plate 19 and the other end pressure plate 12 is a similar casing section 20. Parts 17, 18, 19 and 20 have registering through holes 17a, 18a, 19a, 20a aligned with holes 12a and receiving the bolts 14.

The outer end transverse surfaces of ring 17 press against the flat transverse surfaces of end plates 18, 19. Section 20 has opposite end transverse surfaces pressing an outer transverse surface of end plate 18 and an inner transverse surface of end pressure plate 12, respectively. The other section 20 has opposed end transverse surfaces contacting an outer transverse end surface of end plate 19 and an inner transverse surface of the other end pressure plate 12, respectively. Ring 17 and end plates 18, 19 have similar outer diameters designated by circle A in FIG. 2.

End pressure plates 12 each have an outwardly extending central or axial boss 25 and is axially countersunk as at 26 to receive a roller bearing 27 for the purpose hereinafter appearing. Extending from axial counterbore 26 is a further counterbore 28 of increased diameter receiving an oil seal 29. A cap 30 screwed to one plate 12 by screw 30a closes the counterbore 26.

On the other end pressure place 12 iss a cap 30b formed with a bearing opening 30c. At the inner end of counterbore 28 is a through opening 31 forming a flaring curved surface 32 leading to an inner transverse flat surface 33 in the plane of the inner surface of pressure plate 12 which contacts an adjacent face of engine section 20. The inner surfaces of said pressure plates 12 are formed with coaxial annular grooves 34. The outer diameter of each groove 34 is radially inward of the circle of bolt holes 12a. Said plates 12 each have an outer peripheral surface 12b of the same diameter (circle A) of outer diameter of ring 17 and plates 18, 19.

Gaskets (not shown) are interposed between plates 12 and sections 20, between sections 20 and plates 18 and 19 and between plates 18, 19 and ring 17.

In each of grooves 34 is rotatably mounted an outer end plate 40. Plates 18 and 19 each have at their outer sides, a groove 41 similar to and symmetrically disposed relative to groove 34. In each of said grooves 41 is an inner end plate 42 similar to and symmetrically disposed relative to end plate 40. However end plates 42 are each formed with four transverse part-peripheral through slots 43. Two of the slots in each plate are phased apart about 52°. Two other slots 43 in each end plate 42 are phase 180° from the first two slots, respectively. Each of the slots 43 have semi-circular edges on centers about 12° in angular extent apart. The four slots 43 of ring 42 in plate 18 are phased 90° from the four slots 43 in ring 42 of plate 19. The purpose of the slots 43 will be explained hereinafter. The slots 43 extend longitudinally through plates 42 and are of uniform cross-section throughout. Each section 20 if formed with an inner cavity having opposed vertical inner coextensive flat surfaces 50 merging with a top inner, semi-cylindrical upwardly extending surface 51 and a bottom inner semi-cylindrical downwardly extending surface 52. The end pressure plates 12, the end plates 18, 19, the grooves 34 and plates 40, 42 are coaxial. A horizontal plane through the axis of pressure plates 12 is parallel to and equally spaced between the semi-circular internal surfaces 51, 52 and hence equidistant from the upper end lower ends of flat surfaces 50.

Each section 20 has an upper outer part-cylindrical surface 54 and semi-cylindrical surfaces 55 coaxial with bolt holes 20a and surfaces 56 coaxial with circle A, connecting ends of surfaces 55. Extending down from the rear and front of each section 20 are vertical parallel walls 58, 59 respectively, and vertical parallel side walls 60, 61. Extending down from wall 61 are vertical baffle walls 62 terminating short of wall 60 and forming a slot 63. Also extending down from section 20 are vertical baffle walls 65 terminating short of wall 61 and forming slots 66 therewith. The lower ends of walls 58, 59, 60 61 62 and 65 are in a common plane and form a water cooling chamber 67 closed by a bottom plate 68 screwed to the underside of said walls by screws 69. A gasket 70 may be interposed between plate 68 and the under edges of walls 60, 61, 62, 65, 58, 59. Wall 59 has a plugged hole 72 and wall 58 has a plugged hole 73. Water can be circulated through the baffled chamber 67 by pump means connected to the holes 72, 73, for cooling the engine.

Centrally between the vertical, parallel side surfaces 75, 76 of each section 20, above the axis of the inner cavity thereof, at the rear of the casing, is a boss 77 having an upwardly and inwardly inclined flat surface 78. A through hole 79 inclined upwardly and outwardly and passing through the wall of section 20 comprises an inlet above a horizontal plane passing through the axis of said section. Fixed to surface 78 by studs 80 is an inlet fitting 81 to which carburreted gas is fed, to the exploded and combusted as will be explained hereinafter.

Also integrally formed with each section 20, centrally between said surfaces 75, 76 and aligned with bosses 77, is a boss 82 formed with a passage or hole 83 inclined downwardly and outwardly and located below a horizontal plane passing through the axis of said section. Boss 82 has an outer flat downwardly and inwardly inclined surface 84. Boss 82 merges with wall 58. Screwed to said surface 84 by studs 85 is a fitting 86 leading to an exhaust.

At the front side of each section 20 (opposite to the side which has the passages 79, 83), is a cavity 90 leading to a screw threaded through opening 91 to which a spark plug 92 is screwed. It will be noted that plugged openings 72, 73 are longitudinally offset from cavity 90 and boss 82 respectively.

Rotatably mounted in the engine casing which comprises end pressure plates 12, sections 20, plates 18, 19 and central ring 17, is a rotor 100.

Said rotor 100 comprises a central rotor valve member 101 to opposite ends of which are attached rotor portions 102 rotating in the engine casing sections 20. The rotor valve 101 comprises a central coaxial annular valve flange or portion 103 disposed between the fixed end plates 18, 19 and having an outer diameter of somewhat less diameter than the internal diameter of ring 17. Extending outwardly from the central valve portion 103 are a pair of oppositely extending annular hub portions 105 of a diameter less than the internal diameter of plates 40, 42. It will be observed that the highest point of semi-cylindrical surface 51 of section 20 and the lowest point of semi-cylindrical surface 52 are disposed radially inwardly of the outer diameter of plates 40, 42.

Hubs 105 are nested in countersunk cavities 106 in rotor sections 102. Rotor portions 102 are each fixed to the central rotor valve section 101 by six equiangularly spaced horizontal socketed head studs 107. Said studs 107 have threaded shanks 108 passing through clearance holes 109 in rotor portions 102 and screwed into threaded hole 110 in rotor section 101. Said studs have socketed heads 111 disposed in countersunk holes 112 in the rotor portions 102.

One rotor portion 102 has a pair of diametrically opposed radial slots 113 extending longitudinally across said portion and opening radially outwardly and closed at their inner ends short of the axis of the rotor. The other rotor portion 102 has similar slots but located in a plane at right angles to the plane of the slots in the first rotor portion. The six holes in one rotor portion which receive the studs 107, are offset 30° each from the six stud holes in the other rotor portion. Four of the stud holes in each rotor portion are offset from the slots 113 of both rotor portions, and two of the holes in each rotor portion are aligned with the slots of the other portion, so that none of the stud holes extend to any of the slots and none are aligned.

Figure 1:
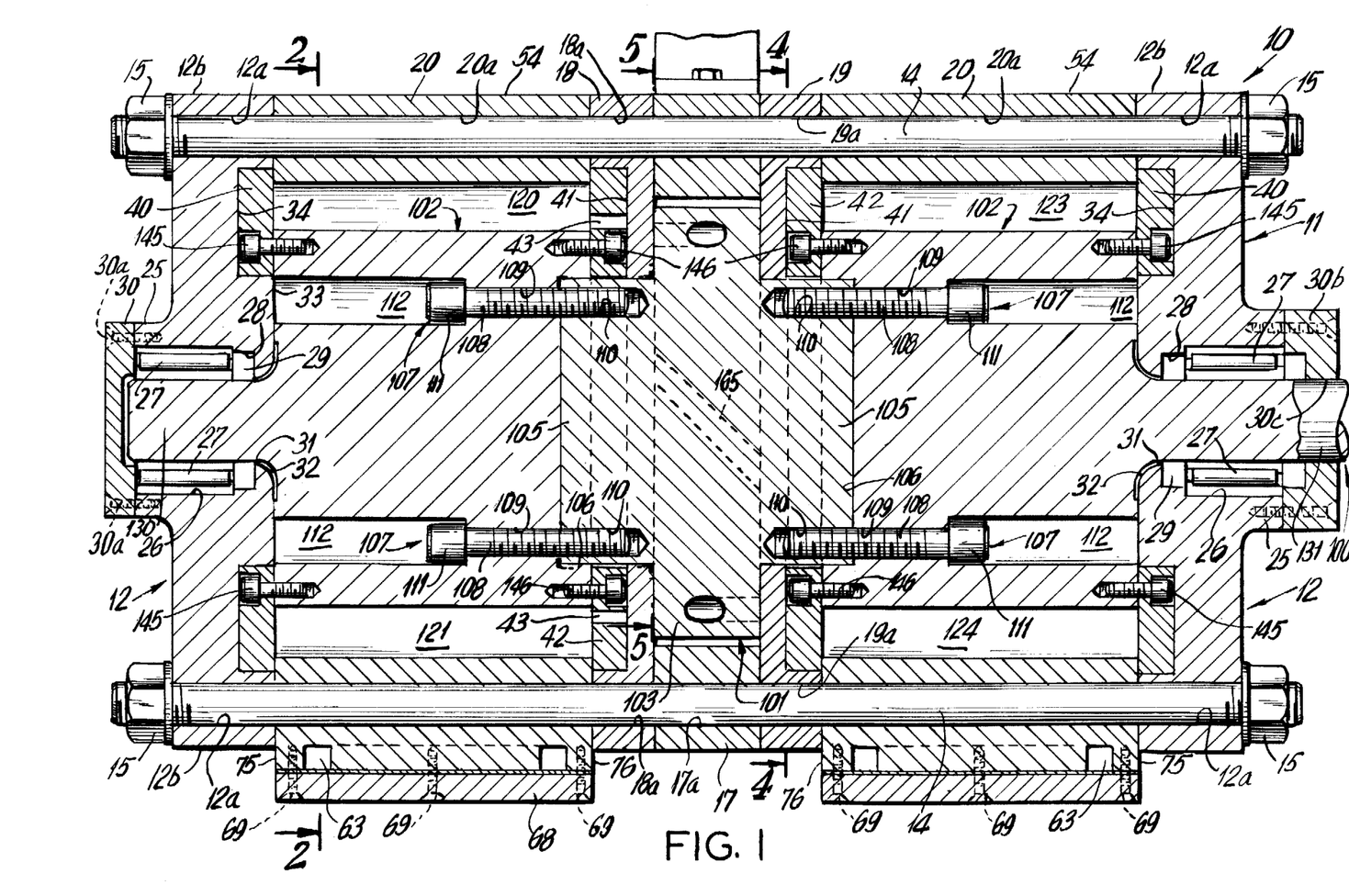
FIG. 1 is a view of an engine embodying the invention showing the left side on cross-section 1—1 of FIG. 2, and the right side, on cross-section 1a—1a of FIG. 4.
Figure 5:
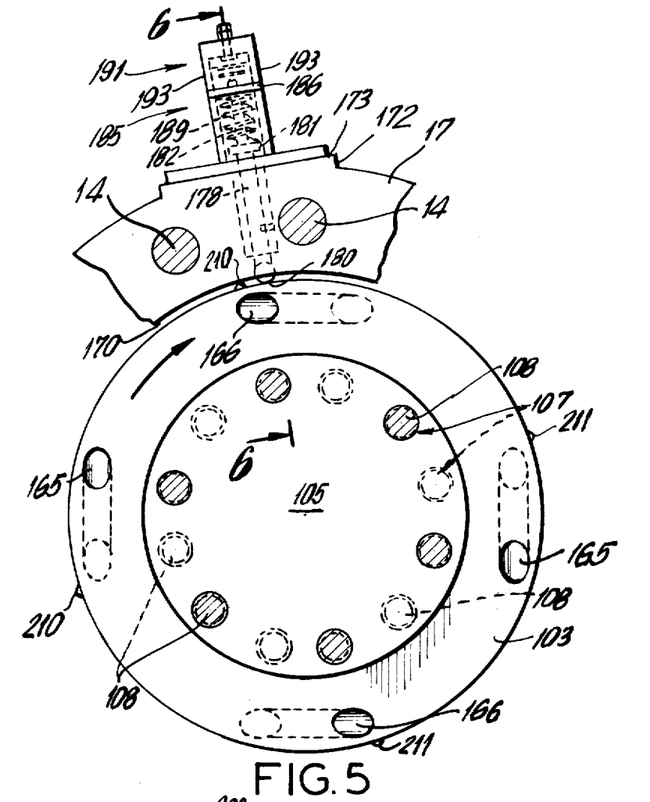
FIG. 5 is a cross-sectional view taken on line 5—5 of FIG. 1.

In FIG. 1, the studs 107 on the left rotor portion 102 are offset 30° from the studs 107 on the rotor portion shown on the left side of said figure. In FIG. 5, the position of all 12 studs are shown with the studs 107 on the right in full lines, and on the left in dotted lines.

In the left engine casing section 20, a top intake chamber 120 is formed and a botton exhaust chamber 121 is formed. These chambers are disposed at opposite sides of the rotor portion of one engine section. The diameter of each rotor portion is such that the rotor portions are in contact with the side vertical surfaces 50 of the internal cavity of the engine casing sections.

In the other engine casing section 20, the rotor portion 102 in the cavity forms a top intake chamber 123 and a bottom exhaust chamber 124. Extending from the rotor portion 102 at the left side of FIG. 1 is an axle 130 passing through the adjacent opening 31 into the roller bearing 27 of the adjacent end pressure plate 12. Extending from the other rotor portion 102 (at the right side of FIG. 1) is an output shaft 131 passing through opening 31 in the other pressure plate 12 in engagement with the adjacent roller bearing 27 and passing out from the casing through opening 30c. Shaft 131 is a drive shaft.

The plates 41, 42 and the annular flange portion 103 of valve member 101 may be relieved at surfaces facing the fixed plates 18, 19, (except around holes or passages to be described hereinafter,) to reduce friction, according to well known engineering practice.

Slidable in slots 113 are plates or pistons 140. The rotor portions 102 are each formed with a pair of blind holes 141 receiving the inner ends of radial coil compression spring 142 which bias the pistons 140 radially outwardly by impinging on the radial inner edges of said pistons. The outer plates 40 are attached to the outer sides of the rotor portions 102 by studs 145 for rotation with said rotor portions. The inner end plates 42 are attached to the inner surfaces of rotor portions 102 by studs 146. Thus inner and outer annular plates or rings 40, 41 rotate with the rotor 100. It will be noted that there are eight studs 146 at each side of the rotor valve 101 and eight studs 145 at the outer ends of the rotor portions. The heads of the studs may be located in countersunk holes in said plates 40, 42.

Said pistons or plates 140 are each formed at their radially outer ends with a part cylindrical groove 150. Said groove is more than 180° in extend forming a mouth 151 facing radially outwardly. Extending from the mouth of each groove 150, 151 are outwardly flaring or tapered surfaces 152. Swivelly mounted at the end of each piston 140 is a longitudinal wiping member 153 having a part cylindrical portion 154 swivelly received in groove 150, and extending therefrom to form a neck 155 smaller than the mouth 151 to allow the wiper to have limited rotation about the axis of groove 150. Extending from neck 155 are outwardly flaring surfaces 156 adapted to allow full swivelling movement of the wipers against the inner surfaces 50, 51, 52 as the rotor is rotated in the casing, as will be explained hereinafter. Extending from the outer ends of the tapered surfaces 156 are parallel surfaces 157 adapted to be aligned with opposite surfaces of the piston 140. Thus, as the rotor turns, the outer surface 158 of the wiper will remain in contact with the inner surface of the cavity (surfaces 50, 51, 52). When the wipers 153 reach the parallel surfaces 50 the wipers will have been pushed radially inwardly to be disposed in the slots 113 as the springs 142 are compressed. These springs always keep the wipers 153 in contact with the inner surfaces of the cavities in the casing or engine sections 20. Means is provided to allow passage of a charge of compressed gas from the top chamber 120 of the left engine section 20, in front of the piston 140 in that chamber, to the bottom chamber 124 of the right engine section 20 behind the piston 140 moving through said bottom chamber, to be fired and exploded upon energizing the spark plug 92 which leads to recess 92a which opens to said bottom chamber. Means is also provided to allow passage of a charge of compressed gas from the top chamber 123 of the right engine section 20 in front of the piston 140 in that chamber, to the bottom chamber 121 of the left engine section 20, behind the piston 140 in that bottom chamber, 90° later, to be exploded by energization of the spark plug 92 leading to a recess 92a which opens to said bottom chamber. Means is also provided to fire the two sparkplugs 92 in timed relation, alternately 90° apart in the rotation of the rotor so that each sparkplug is fired at intervals of 180° in the rotation of the rotor. To this end fixed plate 18 is formed with a downwardly and inwardly 45° slanting through passage 160 and with an upwardly and inwardly 45° inclined or slanting passage 161. The outer ends of slots 160, 161 are spaced apart sufficiently so that the outer end of passage 160 is in position to communication with chamber 120 at the spark plug side, of the engine and the outer end of pasage 161 is in position to communicate with chamber 121, at said spark plug side.

Plate 19 is formed with passages 162, 163 which are similar and symmetrically disposed to passages 160, 161 respectively.

Annular flange portion 103 of rotary valve member 101 is formed with two similar 45° inclined through passages 165, 180° apart each adapted to register and align with passages 162, 161, and is also formed with a pair of 180° apart passages 166 inclined oppositely to passages 165 and 90° apart from said passages 165 and adapted to register with the passages 160, 163.

As the valve member and rotor rotate, through a revolution two slots 43, 180° apart in ring 42 of plate 18 will register with slot 160, a slot 166, slot 163 and slot 43 in plate 42 of plate 19, to cause a charge to move from top chamber 120 of the left engine section 20, to the bottom chamber 124 of the right engine section 20, and the other two slots 43, 180° apart in end plate 42 of plate 19 will register with slot 162, slots 165 and slot 161 and slot 43 in end plate 42 of plate 18 to cause a charge to pass from top chamber 120 to bottom chamber 121.

Each time a slot 43 in plate or ring 42 of plate 18 reaches a slot 160, there is a slot 43 of plate or ring 42 of plate 19 registering with slot 163, and each time a slot 43 of ring 42 on plate 19 reaches slot 162, there is a slot 43 in ring 42 on plate 18 in registry with slot 161.

Figure 6:
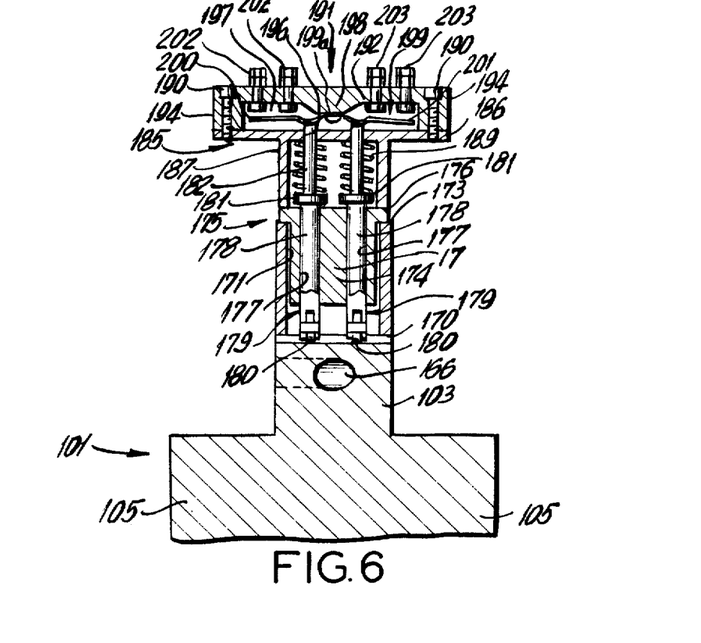
FIG. 6 is a cross-sectional view taken on line 6—6 of FIG. 5.

The firing of the spark plugs is controlled by switch means shown in FIGS. 5 and 6 of the drawing. As shown, the external diameter of annular central portion 103 of rotor valve 101 is somewhat less than the internal diameter of ring 17, leaving an annular space 170 therebetween. Ring 17 is formed with a radial through hole 171 and is provided with a boss 172 having a flat outer surface 173, tangent to the outer circle of the ring. Said hole 171 extends to the middle of surface 173. Projecting down into said hole 171 is the lower end body 174 of a block 175. Said body 174 has a top flange 176 resting on surface 173 and is fixed to said surface in any suitable manner (not shown). Said block 174 is formed with a pair of parallel, bores 177 slidably receiving the shanks 178 of switch actuators 179. At the lower ends of shanks 178 are rotatably mounted followers 180. At the upper ends of shanks 178 and above block 174 are collars 181. Extending up above collars 181 are pins or stems 182. Mounted on block 174 is a closure member 185 comprising a flat wall 186 from which walls 187 project radially inwardly at the four sides of flange 176 to enclose the collars 181 and pins 185. Interposed between the collars 181 and the underside of the portion of wall 186 which is surrounded by walls 187, and surrounding the pins 182, are coil tension springs 189 which bias the members 179 inwardly. Member 185 is fixed to block 174 in any suitable manner (not shown). It will be noted that wall 186 extends beyond opposite sides of ring 17 and block 175. The shanks 178 of members 179 are in a common plane passing through the axis of member 101 and are equally spaced inwardly from the opposite side surfaces of annular flange 103.

Fixed to the top of plate or wall 186, by screws 190 is cover case 191 having a top wall 192, side walls 193 and end walls 194. The pins 182 slidably pass through openings 196 in wall 186 and project up into the space 197 bounded by walls 186, 193, 194, 192.

Said top wall 192 is formed, at its underside with a central projection 198 to which a spring contact switch member 199 is centrally attached by a rivet 199a. Said switch member 199 is made of conductive, resilient metal and has spring arms 200, 201 extending in opposite directions. Fixed to top wall 192 on one side thereof are a pair of fixed electric terminals 202 insulated from member 191 and disposed side by side above spring arm 200. Also fixed to top wall 192 and insulated from member 191, are a pair of terminals 203 disposed above spring arm 201. When member 179 at the left of FIG. 6 is raised, in the manner hereinafter appearing, pin 182 on the left moves spring arm 200 upwardly to bridge the contacts 202. When the other pin 179 is raised, as described hereinafter, spring arm 201 bridges the terminals 203.

Means is provided to raise the members 179 in timed sequence in the revolution of the rotor. To this end flange 103 is provided with two raised radial lugs 210 spaced 180° apart located in space 170 and in the transverse plane of the axis of the follower 180 at the left of FIG. 6, and two raised, radial lugs 211 in the transverse plane through the axis of the follower 180 on the right of FIG. 6.

As the rotor rotates, terminals 202 are bridged every 180° rotation of the rotor, and terminals 203 are bridged every 180° rotation of the rotor. The terminals 202 and 203 are alternately bridged every 90° of rotation of the rotor. When terminals 202 are bridged one spark plug is energized by providing a suitable circuit for said terminals and a source of electric power (not shown), and when terminals 203 are bridged, the other spark plug is energized by a suitable circuit. In this manner the spark plugs are energized alternately every 90° of rotation of the rotor. The lugs 210, 211 are so arranged angularly that as each pair of terminals is bridged, passages 165 or 166 are aligned with openings 161, 162 or with openings 160, 163. At each alignment, an opening 43 of the left plate 42, or an opening 43 of the right plate 42 registers with opening 160 or 162 and an opening 43 of an opposite plate 42 registers with an opening 161 or 163 adjacent said opposite plate. Thus, every 90° rotation of the rotor, a compressed charge moves from the top chamber of one rotor section to the bottom chamber of the other rotor section, and such action alternates from left section to right section and from right section to left section.

Figure 7:
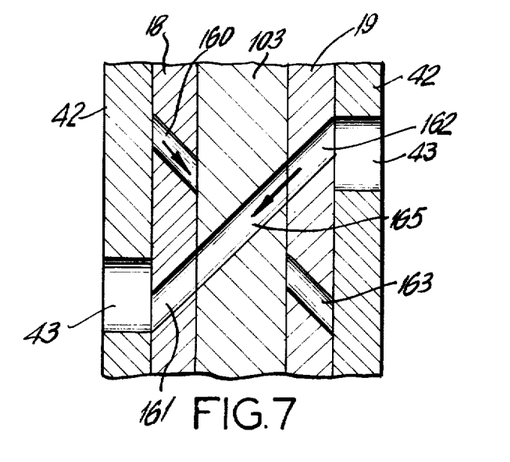
FIG. 7 is a cross-sectional view showing passage of compressed charge in right top chamber to bottom left chamber on section line 7—7 of FIG. 2.

In FIG. 7, the rotor is at an angle where a charge can pass from the top chamber of the right engine section through opening 43, leading to top chamber 123, passages 162, 165, 161 and opening 43 leading to the bottom chamber 121 of the left engine section.

Figure 2:
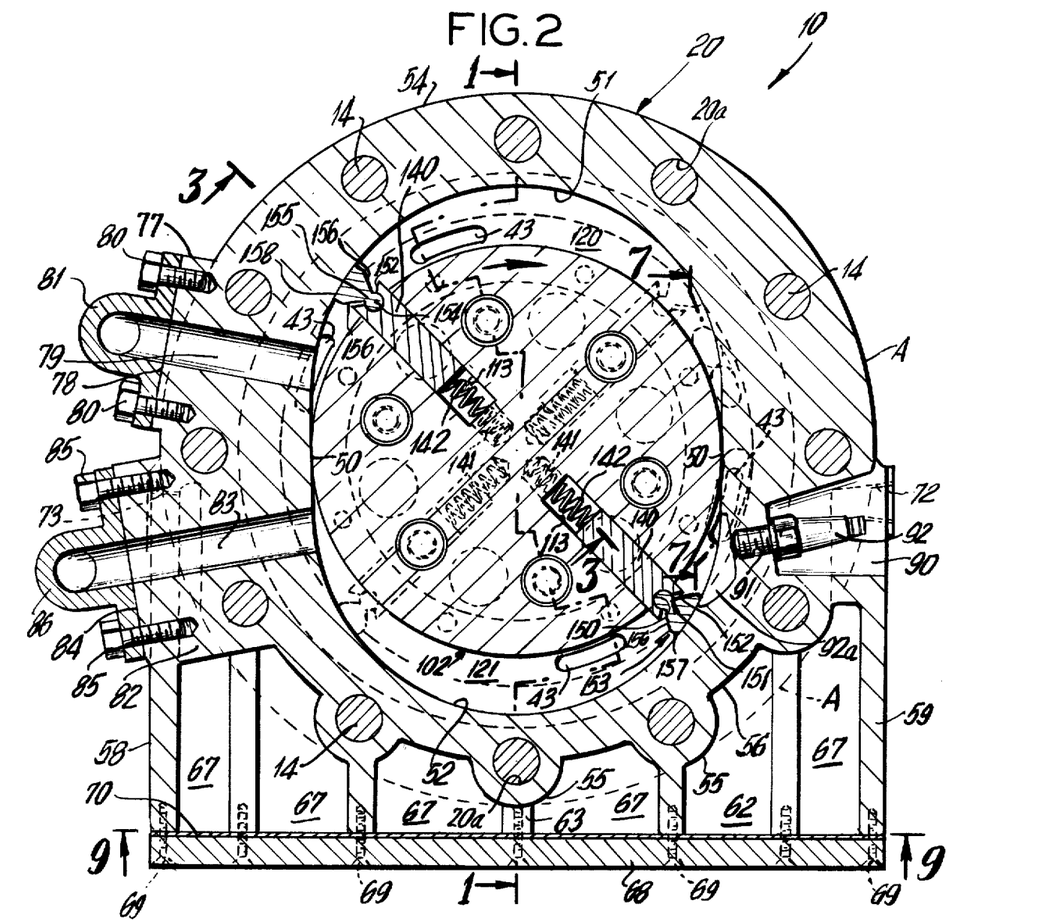
FIG. 2 is a cross-sectional view taken on line 2—2 of FIG. 1.
Figure 3:
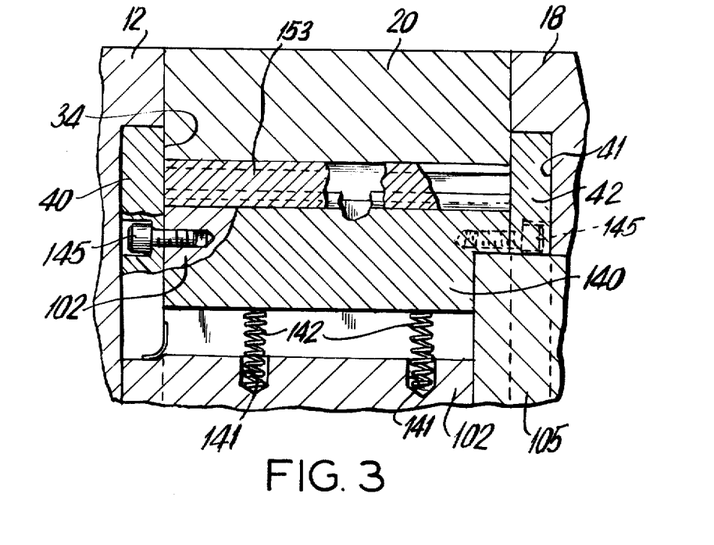
FIG. 3 is a cross-sectional view taken on line 3—3 of FIG. 2.
Figure 4:
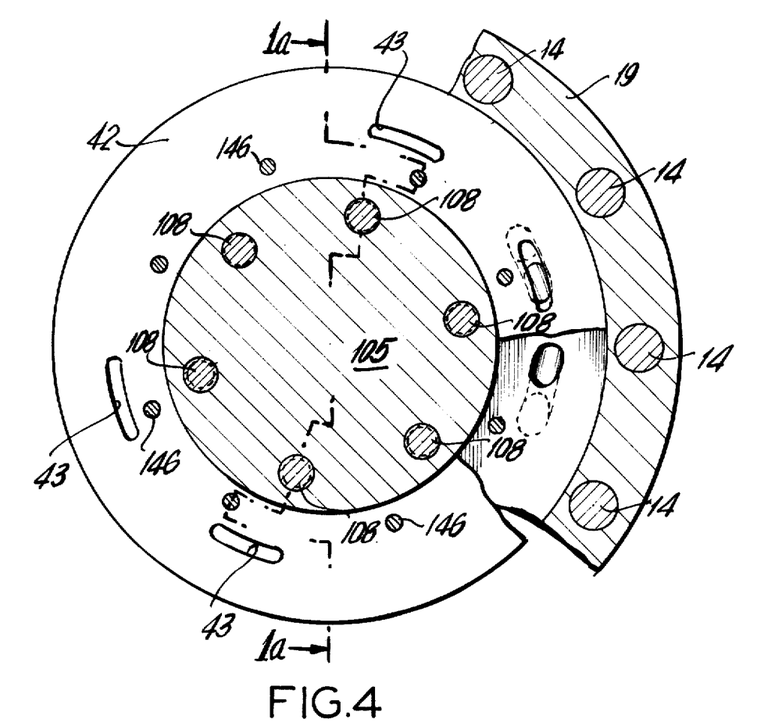
FIG. 4 is a cross-sectional view taken on line 4—4 of FIG. 1.

As the rotor rotates clockwise, looking at FIG. 2, carburetted gas moves through inlet passage 79 to chamber 120, behind the piston 140 while gas in front of the piston is compressed in chamber 120. When said piston 140 reaches opening 160, an opening 43 of the left end plate 42 reaches opening 160 which at that time is aligned with a passage 166 in flange 103 and with passage 163 so that the compressed charge passes to the bottom chamber 124 of the right engine section behind the piston 140, in said chamber 124. At this time, the spark plug 92 on the right side sparks the charge to cause an explosive combustion which causes rotation of the rotor, while the exhaust gas in front of the piston in chamber 124 is moved out through the exhaust outlet 83 from said chamber 124.

At the same time, gas from the inlet on the right side, enters chamber 123 behind the piston 140 in said chamber, while gas in front of said piston is compressed. When the piston in said chamber 123 reaches the angle where, as illustrated in FIG. 7, opening 43 of the right end plate 42 registers with openings 162, 165, 161 and opening 43 of the left end plate 42, the compressed charge passes down to chamber 121 behind the piston 140 in said chamber, and the spark plug on the left engine section is energized to explode the charge in chamber 121 behind the piston for a combustion phase, causing the rotor to rotate an sending exhaust gases in front of the piston 140 in said chamber to exhaust through the outlet 83 of the left engine section. Thus the rotor keeps rotating to drive shaft 131.

Figure 8:
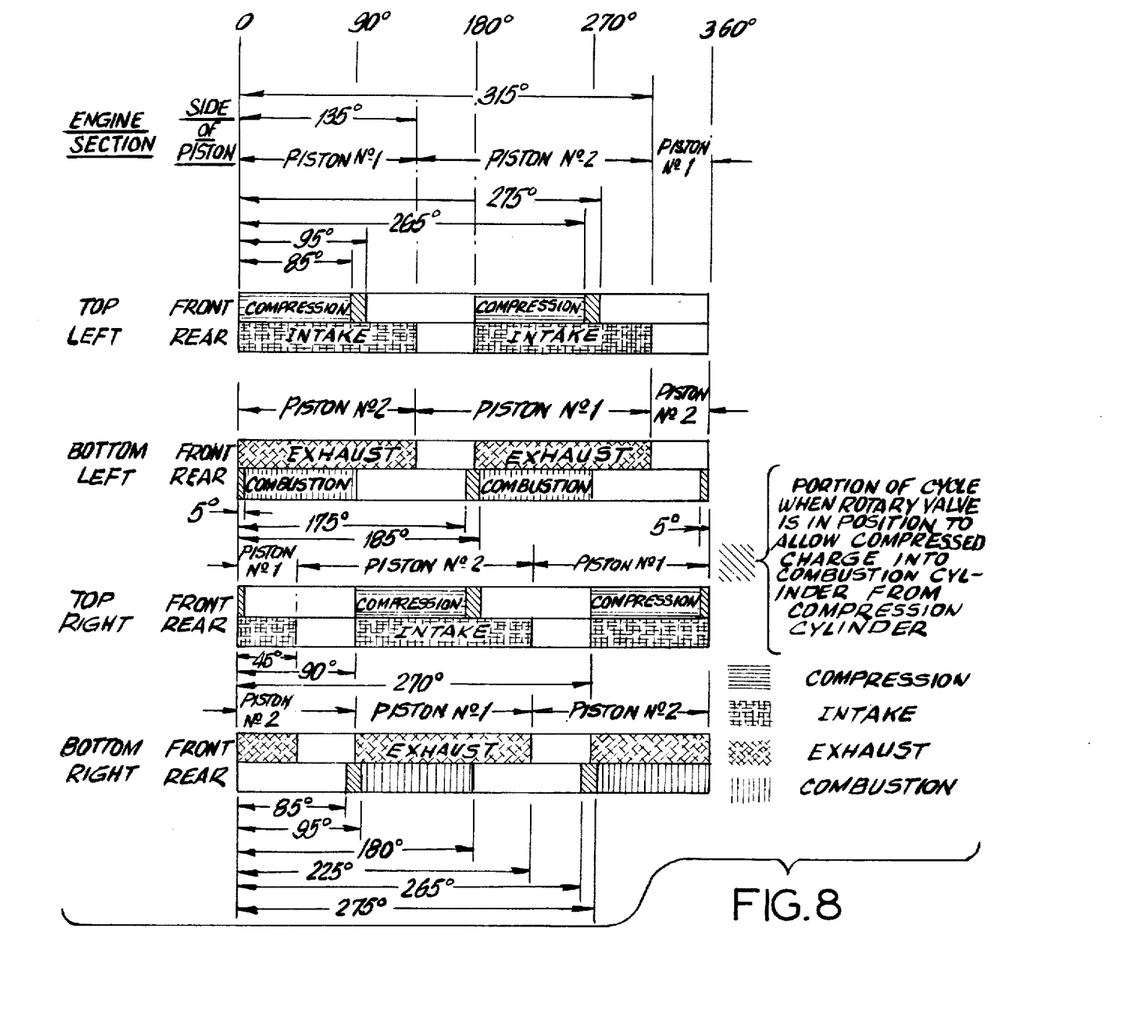
FIG. 8 is a timing diagram explaining the operation of the engine embodying the invention.
Figure 9:
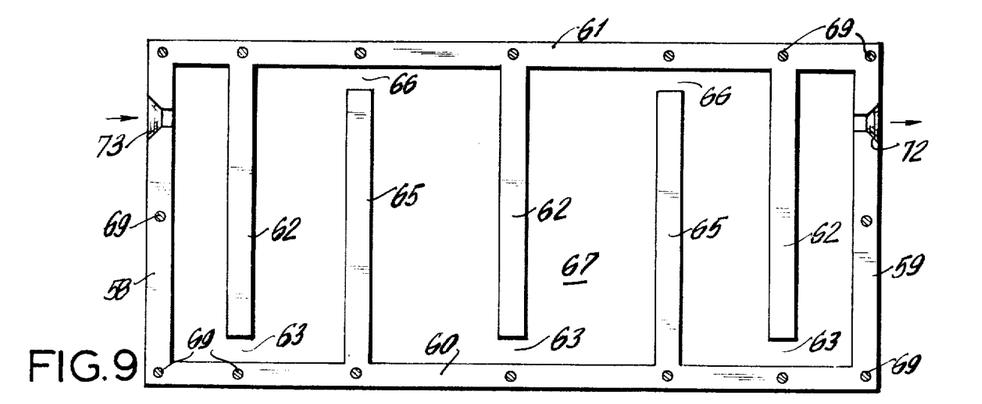
FIG. 9 is a cross-sectional view taken on line 9—9 of FIG. 2.

In FIG. 8 there is shown a diagram giving the angles in a 360° revolution of the rotor where different operations take place in the left and right engine sections, showing what happens at simultaneous angles in the left and right engine sections, in the top and bottom chambers of each, and in front and at the rear or behind the piston in said chambers.

A legend is appended to this diagram to show the markings which designate compression, intake, exhaust, combustion and portion of cycle when the rotary valve is in position to allow compressed charge from a top chamber of one side of the engine in front of a piston in said chamber to move into the bottom chamber of the other side of the engine, behind the piston in said bottom chamber.

Referring now to the diagram of FIG. 8:

In each rotor, one piston of each rotor portion is designated "piston No. 1" and the other "piston No. 2". This diagram shows that the compression of gas in the top left chamber 120 in front of the piston No. 1 in said chamber, lasts for 85° from an initial angle of rotation, and then passage of the compressed charge to the bottom right chamber 124 for 10°, making a total of 95°. The intake from said initial angle at the rear of said piston No. 1, lasts for 135°. At 180° from the initial angle, piston No. 2 in chamber 120 again begins a compression cycle of 85° on the top chamber 120, followed by 10° of passage of a charge to the left lower chamber 124. At the end of 180° from the initial angle, intake starts at the rear of piston No. 2 and lasts for another 135° of rotation.

In the bottom left chamber 121, exhaust lasts for 135° from said initial angle, at the front of piston No. 2 followed by a second exhaust period in front of piston No. 1 for another 135°, starting 180° from the initial angle. At the rear of piston No. 2, receipt of charge from the top right chamber 123, lasts for 5° from initial angle followed by 85° of combustion at rear of piston No. 2. At 175° from initial angle, at rear of piston No. 1 in the bottom left chamber 121, a charge is received from top right chamber 123 for 10° followed by a combustion period of 85°. Another charge is received at rear of piston No. 2 in the bottom left chamber 121 for 5° beginning at 355° from initial angle.

In the top right chamber 123, in front of piston No. 1, beginning with said initial angle, there is a 5° period of passage of charge to bottom left chamber 121. At end of 90° from initial angle in front of piston No. 2, compression lasts in front of piston No. 2 for 85°, followed by 10° of sending a charge to bottom left chamber 121. At 270° from initial angle, in front of piston No. 1, another compression period in top right chamber 123 lasts for 85° followed by a 5° period of sending a charge to bottom left chamber 121. In the top right chamber 123 at rear of piston No. 1, beginning with the initial angle there is a 45° angle of intake of gas. At 90° from initial angle another period of intake of gas at rear of piston No. 2 lasts for 135°. At 270° from initial gangle, at rear of piston No. 1, there is another 90° of intake of gas.

In the bottom right chamber 124, in front of piston No. 2 there is a 45° period of intake followed by a 135° period of intake beginning 90° from said initial angle, in front of piston No. 1. At 270° from initial angle, another 90° period of intake starts in front of piston No. 2.

At the rear of piston No. 2, beginning 85° from initial angle, there is a 5° angle of receiving a charge from the top left chamber 121, followed by another 5° period of receiving a charge from said top left chamber 121 at rear of piston No. 1, followed by 85° of combustion at rear of piston No. 1. At end of 265° from initial angle, there is another 10° angle of receiving a charge from the top left chamber 121 at rear of piston No. 2, followed by another 85° of combustion at rear of piston No. 2.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. An energy converter comprising a casing having a pair of separate cavities, cylindrical rotor portions rotating separately in said cavities, respectively, the axis of rotation of each rotor being coaxial with its cavity, means to connect said rotor portions for concurrent rotation at the same rate of speed, piston means slidably mounted on each of said rotor portions and having wiping contact with the internal surface of the cavity for said rotor portion, said cavities each being of substantially elliptical shape and each having a long elliptical axis and a short elliptical axis, the long elliptical axes of said cavities being located in a common plane, each having an intake chamber on one side of the rotor portion in said cavity and an exhaust chamber on the other side of said rotor portion in said cavity, gas inlet means for each intake chamber, gas outlet means for each exhaust chamber, spark plug means for each exhaust chamber, and valve means to establish communication between the intake chamber of each cavity with the exhaust chamber of the other cavity.

2. An energy converter comprising a casing having a pair of cavities, rotor portions rotating in said cavities, respectively, means to connect said rotor portions for concurrent rotation at the same rate of speed, piston means on each of said rotor portions having wiping contact with the internal surface of the cavity for said rotor portion, said cavities each having an intake chamber on one side of the rotor portion in said cavity and an exhaust chamber on the other side of said rotor portion in said cavity, gas inlet means for each intake chamber, gas outlet means for each exhaust chamber, spark plug means for each exhaust chamber, and valve means to establish communication between the intake chamber of each cavity with the exhaust chamber of the other cavity, said piston means comprising a pair of slidable pistons on each rotor portion, and swivelled means at the ends of said pistons having wiping engagement with said internal surfaces of said cavities.

3. An energy converter comprising a casing having a pair of cavities, rotor portions rotating in said cavities, respectively, means to connect said rotor portions for concurrent rotation at the same rate of speed, piston means on each of said rotor portions having wiping contact with the internal surface of the cavity for said rotor portion, said cavities each having an intake chamber on one side of the rotor portion in said cavity and an exhaust chamber on the other side of said rotor portion in said cavity, gas inlet means for each intake chamber, gas outlet means for each exhaust chamber, spark plug means for each exhaust chamber, and valve means to establish communication between the intake chamber of each cavity with the exhaust chamber of the other cavity, said cavities and rotor portions being coaxial, the pistons of each rotor portion being radially disposed to said rotor portion, and spring means to move the pistons of each pair of pistons in opposite directions.

4. The combination of claim 2, the pistons of one rotor portion being disposed at an angle to the pistons of the other rotor portion.

5. A energy converter comprising a casing, said casing have a pair of cavities, a rotor portion in each cavity forming an intake chamber and an exhaust chamber for each cavity on opposite sides of the rotor portion in said cavity, gas intake means leading to the intake chamber of each cavity, exhaust outlet means leading from the exhaust chamber of each cavity, spark plug means for the exhaust chamber of each cavity, a pair of pistons slidable on each rotor portion, means to bias each pair of pistons outwardly away from each other into contact with internal surfaces of said cavity, and valve means to pass a charge of gas compressed in the intake chamber of each cavity in front of a piston in said intake chamber, to the exhaust chamber of the other cavity behind a piston in said exhaust chamber, for combustion in said exhaust chamber of said other cavity, behind said piston in said exhaust chamber, and to cause inlet of gas into the intake chamber of each cavity behind said piston in said intake chamber from said gas inlet means, and to cause movement of exhaust gas in front of said piston in said exhaust chamber of each cavity to said exhaust outlet means leading from the exhaust chamber of each cavity.

6. The combination of claim 5, and annular inner and outer end plates fixed to each rotor portion and journalled in said casing and having wiping contact with the pistons slidable on said rotor portion.

7. The combination of claim 6, and means on said casing and controlled by said rotor to alternately fire said spark plug means.

8. An energy converter comprising a casing having end walls, and a pair of aligned left and right casing sections between said end walls, and formed with cavities having internal opposed coextensive inner surfaces merging with opposed internal semi-cylindrical surfaces, a rotor mounted for rotation in said casing about an axis in a plane at right angles to said coextensive surfaces and disposed medially between the ends of said coextensive surfaces and parallel to the axis of said semi-cylindrical surfaces and having cylindrical rotor portions in said casing sections coextensive with said casing sections, a pair of pistons slidably mounted in each rotor portion, and said rotor portions forming a top chamber and a bottom chamber in each section, at opposite sides of said rotor portions, a pair of opposed, longitudinal pistons slidably mounted in each rotor portion, the pistons of one rotor portion being disposed at an angle to the pistons of the other rotor portion, means to keep the outer ends of said pistons in wiping relation with the interior surfaces of said casing sections, respectively, an inlet for gas in communication with the top chamber of each casing section, an outlet at the bottom chamber of each casing section, a spark plug at the bottom chamber of each casing section, and valve means to allow a charge of gas compressed by the piston in the top chamber of each casing section, to pass to the bottom chamber of the other casing section for explosion and combustion by the spark plug for said bottom chamber.

9. The combination of claim 8, said means to keep the outer ends of said pistons in wiping engagement with the interior surfaces of said sections, comprising springs to bias said pistons outwardly.

10. The combination of claim 8, and wiping elements swivelled longitudinally to the outer ends of said pistons and having wiping engagement with the interior surfaces of said sections.

11. The combination of claim 8, said valve means comprising a valve member disposed between said rotor portions and fixed thereto and having four through passages spaced 90° apart, a pair of said passages spaced 180° apart, serving to connect the top chamber of the one casing section to the bottom chamber of the other section, and a pair of passages spaced 180° apart and alternating with said first pair of passages and connecting the top chamber of said other section to the bottom chamber of said one section.

12. The combination of claim 11, inner and outer end plates attached to opposite sides of each rotor portion and rotating with said rotor, and the end plates of each rotor portion having sliding contact with opposite side edges of the pistons on said rotor portion.

13. The combination of claim 12, said inner end plates each having four through openings adapted to alternatively align with adjacent ends of the passages in said valve member.

14. The combination of claim 13, and fixed end plates interposed between said valve member and said inner end plates, and each having a pair of passages adapted to alternately align with adjacent ends of the through passages of said valve member and with openings of the adjacent inner end plate.

15. The combination of claim 8, and means to cause compression of gas in front of the piston in the top left chamber to compress a charge, then to pass said charge to the bottom right chamber during a first 180° rotation of said rotor, while causing intake of gas at the rear of said piston in said top left chamber, to exhaust gas from the bottom right chamber, in front of the piston in said right bottom chamber, and cause combustion at the rear of the piston of the right bottom chamber, and to cause compression of gas in front of the piston in the top right chamber to form a charge and intake of gas at the rear of the piston in the right top chamber and to pass the charge from the top right chamber to the bottom left chamber behind the piston in said bottom left chamber, and to cause exhaust in said bottom left chamber in front of the piston in said bottom left chamber and to cause combustion of the charge in said bottom left chamber at the rear of said piston in said bottom left chamber.

16. The combination of claim 15, wherein said last means operates during a 180° rotation of the rotor.

17. The combination of claim 16, wherein said last means repeats the operation during a successive 180° rotation of said rotor.

18. The combination of claim 8, and means to alternately energize said left and right spark plugs each 90° rotation of said rotor.

19. The combination of claim 8, said energize means comprising electrical contacts movably mounted on said casing, and means on said rotor to alternately actuate said contacts each 90° rotation of said rotor.

20. The combination of claim 8, the pistons of each rotor portion being aligned and extending radially of the axis of said rotor portion in opposite directions, and the pistons on one rotor portion being disposed at right angles to the pistons of the other rotor portion.

21. The combination of claim 8, said rotor portions contacting said flat surfaces of said casing sections.

22. The combination of claim 8, said valve means comprising a valve member disposed between said rotor portions and fixed thereto and having four through passages spaced 90° apart, a pair of said passages spaced 180° apart, serving to connect the top chamber of the one casing section to the bottom chamber of the other section, and a pair of passages spaced 180° apart and alternating with said first pair of passages and connecting the top chamber of said other section to the bottom chamber of said one section, inner and outer end plates attached to opposite sides of each rotor portion and rotating with said rotor, and the end plate of each rotor portion having sliding contact with opposite side edges of the pistons on said rotor portion, said inner end plates each having four through openings adapted to alternately align with adjacent ends of the passages in said valve member, and fixed end plates interposed between said valve member and said inner end plates, and each having a pair of passages adapted to alternately align with adjacent ends of the through passages of said valve member and with openings of the adjacent inner end plate, a ring interposed between said fixed end plates and surrounding said valve member, and a plurality of tie rods passing through registering openings in said ring, fixed end plates, engine casing sections and end walls to assemble said casing.

23. The combination of claim 8, said casing sections being formed at their undersides with a water chamber provided with baffle means, and an inlet and an outlet, for circulation of water therethrough.

24. The combination of claim 8, said valve means comprising a valve member disposed between said rotor portions and fixed thereto and having four through passages spaced 90° apart, a pair of said passages spaced 180° apart, serving to connect the top chamber of the one casing section to the bottom chamber of the other section, and a pair of passages spaced 180° apart and alternating with said first pair of passages and connecting the top chamber of said other section to the bottom chamber of said one section, inner and outer end plates attached to opposite sides of each rotor portion and rotating with said rotor, and the end plates of each rotor portion having sliding contact with opposite side edges of the pistons on said rotor portion, said inner end plates each having four through openings adapted to alternately align with adjacent ends of the passages in said valve member, and fixed end plates interposed between said valve member and said inner end plates, and each having a pair passages adaptive to alternately align with adjacent ends of the through passages of said valve member and with openings of the adjacent inner end plate, and means on said end walls to journal said outer end plates.

25. An energy converter comprising means to provide a pair of cavities, a rotor portion in each cavity, means to connect said rotor portions for concurrent rotation at same speed of rotation, each cavity having an intake chamber and an exhaust chamber, said chambers being disposed on opposite sides of the rotor portion in said cavity, spark plug means for the exhaust chamber of each cavity, piston means on each rotor portion projecting into the chambers of the respective cavities for said rotor portions, valve means to establish communication between the intake chamber of each cavity with the exhaust chamber of the other cavity, a fuel intake passage for each intake chamber and an exhaust passage for each exhaust chamber of said cavities, each cavity having a continuous internal surface disposed about the axis of said cavity and side surfaces on opposite sides of said internal surface, said piston means comprising pistons having wiping contact with said continuous surface.

26. The combination of claim 25, each cavity having parallel side walls, and annular end plates fixed to opposite sides of each rotor portion and rotatable therewith, and means on said side walls of each cavity to journal said end plates.

27. The combination of claim 26, each piston means comprising a pair of pistons slidable on one of said rotor portions, means to bias each pair of pistons outwardly away from each other, and the side edges of the pistons of each rotor portion having wiping contact with the end plates of the cavity for said rotor portion.

28. A rotary energy converter comprising a casing formed with a cavity having an internal continuous surface and parallel side surfaces at opposite sides of said internal surface, a rotor portion in said cavity, pistons slidable on said rotor portion, means to bias the pistons outwardly into wiping contact with said internal surface, and a pair of end plates fixed to said rotor portion and rotatable therewith, said pistons having side edges having sliding contact with said end plates.

29. The combination of claim 28, each internal surface comprising a pair of part cylindrical surface portions out of contact with respect to said rotor portion and merging with a pair of opposed surface portions contacted by said rotor portion.

30. An energy converter comprising a casing having a pair of cavities, each cavity comprising an internal continuous surface disposed about the axis of said cavity, and side walls at opposite sides of said internal continuous surface, a rotor portion in each cavity, means to rotate said rotor portions simultaneously at the same rate of rotation, piston means on each of said rotor portions having wiping contact with the internal surface of the cavity for said rotor portion, each cavity having an intake chamber and an exhaust chamber, said intake and exhaust chambers being located on opposite sides of the rotor portion in said chamber, a gas fuel intake for each intake chamber, a gas exhaust for each exhaust chamber, spark plug means for each exhaust chamber, and valve means establishing communication between the intake chamber of each cavity with the exhaust chamber of the other cavity.

31. The combination of claim 30, annular end plates attached to the sides of each rotor portion, means on said side walls to journal said end plates, and said piston means for each rotor portion comprising a pair of radial pistons slidable radially on said rotor portion, spring means to bias said pistons radially outwardly, and said pistons having side edges having radial sliding contact with said end walls.

32. An energy converter comprising a casing formed with cavities having internal opposed coextensive inner surfaces merging with opposed internal part-cylindrical surfaces, a cylindrical rotor portion mounted for rotation in each cavity about an axis parallel to the axes of said part-cylindrical surfaces and medially therebetween, a pair of diametrically opposed pistons slidably mounted in each rotor portion, and said rotor portions forming an intake chamber and an exhaust chamber in each cavity, at opposite sides of said rotor portions, the pistons of one rotor portion being disposed at right angles to the pistons of the other rotor portion, means to keep the outer ends of said pistons in wiping relation with the interior surfaces of said cavities, respectively, an inlet for gas in communication with the intake chamber of each cavity, an outlet at the exhaust chamber of each cavity, a spark plug at the exhaust chamber of each cavity and valve means to allow a charge of gas compressed by the piston in the intake chamber of each cavity to pass to the exhaust chamber of the other cavity for explosion and combustion by the spark plug for said exhaust chamber.

33. An energy converter comprising a casing having a cavity, a rotor rotatably mounted in said cavity, said cavity having an internal continuous surface, said internal surface of said cavity comprising opposed surface portions contacting diametrically opposed portions of the periphery of said rotor, and curved end portions merging with said opposed portions and spaced from said rotor, said rotor and internal surface forming a chamber on each side of the rotor, an inlet and an outlet for each chamber, said rotor being formed with diametrically opposed slots, diametrically opposed pistons slidable radially in said slots, spring means on said rotor to bias said pistons radially outwardly, and means swivelled to the outer ends of said pistons for movement through limited angles and having wiping contact with the internal surface of said cacity, and a pair of rings rotatably mounted in said casing on opposite sides of said rotor, coaxially thereof, means to fix said rings to the opposite sides of said rotor, for rotation therewith, and the side edges of said pistons having radial sliding contact with said rings.

* * * * *